(12) United States Patent
Ninomiya (10) Patent No.: US 6,527,584 B2
(45) Date of Patent: Mar. 4, 2003

(54) BATTERY HOLDER FOR HOUSING FLAT BATTERY

(75) Inventor: Nobuyuki Ninomiya, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/920,082

(22) Filed: Jul. 31, 2001

(65) Prior Publication Data

US 2002/0022399 A1 Feb. 21, 2002

(30) Foreign Application Priority Data

Aug. 21, 2000 (JP) .......................... 2000-254264

(51) Int. Cl.$^7$ ................................. H01R 3/00
(52) U.S. Cl. ................. 439/500; 429/97; 429/100; 439/341
(58) Field of Search ................ 439/500, 341, 439/376, 326; 429/96, 97, 100

(56) References Cited

U.S. PATENT DOCUMENTS 5,931,693 A   8/1999  Yamazaki ................. 439/500
5,980,309 A * 11/1999 Frantz et al. ............... 439/500

* cited by examiner

Primary Examiner—Javaid Nasri
(74) Attorney, Agent, or Firm—Beyer Weaver & Thomas LLP (57) ABSTRACT

A battery holder structure for a flat battery allows the battery, when it is to be inserted into the battery holder, to be readily inserted and, at the same time, to be firmly engaged and to be prevented from springing out of the case or its contacts from becoming disconnected when any vibration or impact from outside is suffered. In a case 1 having in its top face an opening 1d through which a battery 2 is to be inserted, protruding barriers 1h are formed toward one end of the opening 1d to engage with the top face of the inserted battery 2 to prevent the battery 2 from coming off, and a battery holding section 3 having elastically deformable elastic arms 1g is formed toward the other end of the opening 1d in the case 1 opposite these protruding barriers 1h, the arms 1g turning toward the bottom plate 1b along with the insertion of the battery 2 and pressing the peripheral face 2a of the battery 2 toward the peripheral wall 1c.

5 Claims, 11 Drawing Sheets

BATTERY HOLDER FOR HOUSING FLAT BATTERY

BACKGROUND OF THE INVENTION

1. Field of the Invention

The present invention relates to a structure of a battery holder for use in backing up a memory in various electronic devices including game software and office machines, and more particularly to a housing structure for a flat battery.

2. Description of the Related Art

Figure 14:
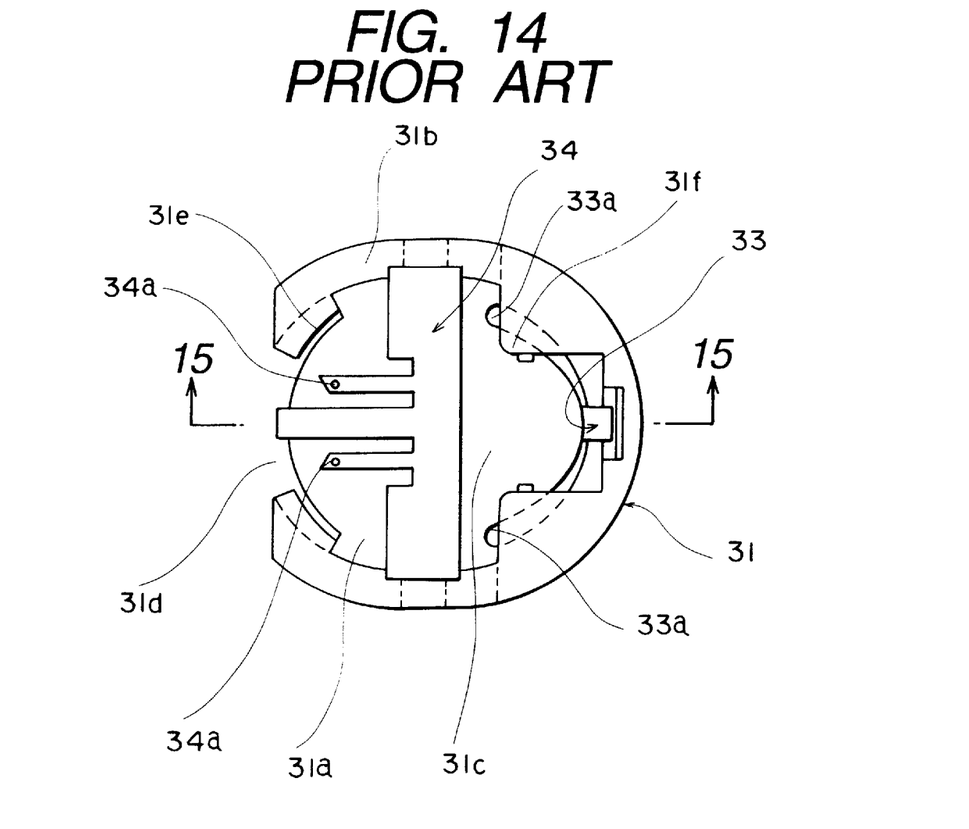
FIG. 14 is a plan illustrating the structure of a battery holder according to the prior art.
Figure 15:
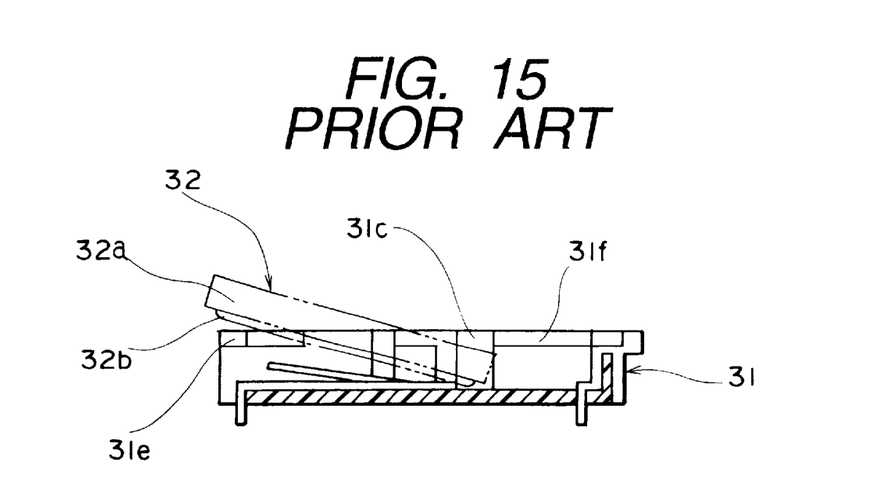
FIG. 15 is a sectional view of the battery according to the prior art along a line 15—15 in FIG. 14.
Figure 16:
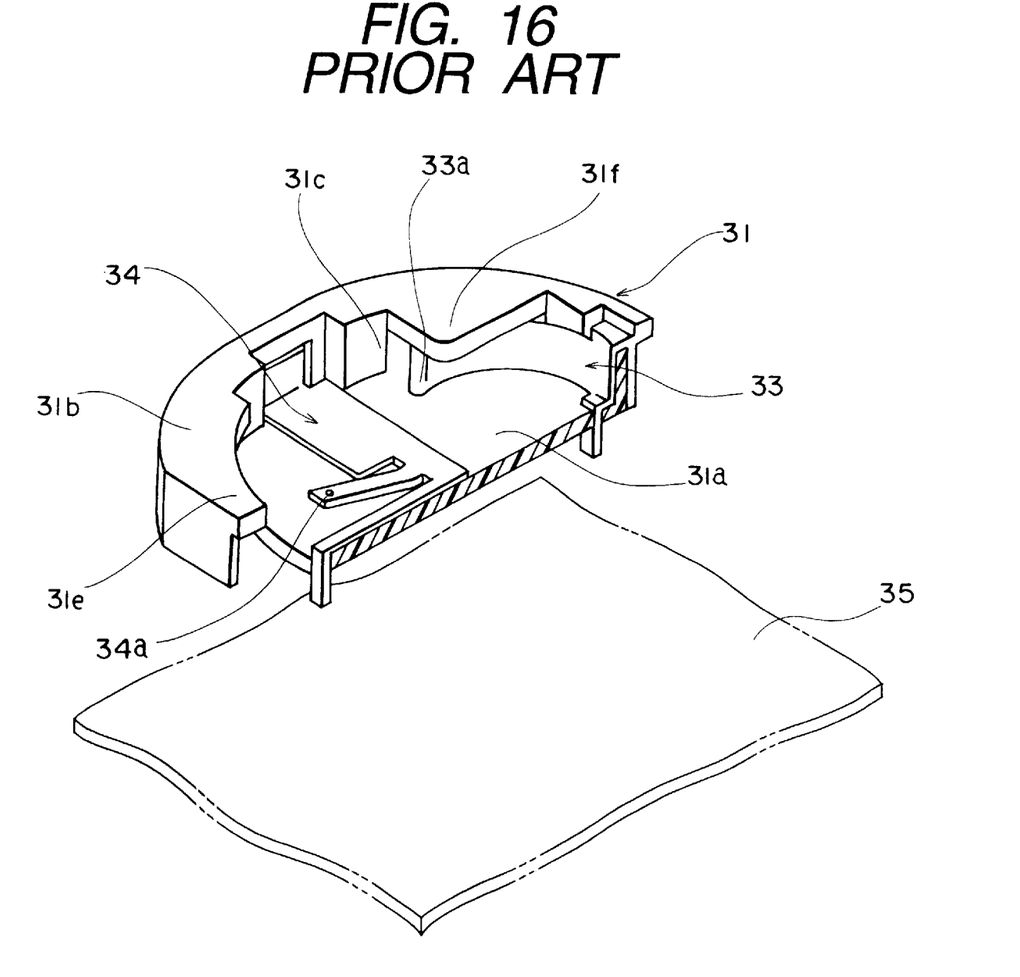
FIG. 16 is a perspective view of the battery according to the prior art cut along the line 15—15 in FIG. 14.

The structure of a battery holder for a flat battery according to the prior art is illustrated in FIG. 14 through FIG. 16. FIG. 14 is a plan of the battery holder; FIG. 15, a sectional view along a line 15—15 in FIG. 14; and FIG. 16, a perspective view of the battery cut along the line 15—15 in FIG. 14.

Referring to the drawings, a case 31, consisting of an insulator such as a synthetic resin, is formed in a substantially cylindrical shape with an opening at the top. In this case 31 are provided a bottom plate 31a to meet one face of a flat battery 32 and a peripheral wall 31b to meet this battery 32, and at its top is arranged an opening 31c through which the battery 32 is to be inserted. At one end of the peripheral wall 31b is provided a notch 31d, and opposite this notch 31d is arranged, inside the peripheral wall 31b and in contact with the peripheral face of the inserted battery 32, a first terminal 33 having elasticity to press this battery 32 toward the notch 31d. Inside the bottom plate 31a is arranged a second terminal 34 in contact with one face of the battery 32. Toward the upper end of the peripheral wall 31b where the notch 31d and the first terminal 33 are provided, protruding barriers 31e and 31f to prevent the battery 32 from coming off from the opening 31c are arranged to suppress the upper face of the battery 32 inserted through the opening 31c.

The first and second terminals 33 and 34 are formed of plates of springy metal, such as stainless steel, and nickel-plated or otherwise appropriately treated on the surface. The first terminal 33 is provided with a pair of first contacts 33a arranged within the peripheral wall 31b of the case 31 and in contact with the peripheral face (the positive pole face) 32a of the flat battery 32, while the second terminal 34 is provided with a second contacts 34a arranged within the bottom plate 31a of the case 31 and in contact with the bottom face (the negative pole face) 32b of the battery 32. One end each of the first and second terminals 33 and 34, protruding out of the case 31, is connected to the conduction pattern (not shown) of a printed circuit board 35.

Then, to house the flat battery 32 in the battery holder, after mounting the battery holder on the printed circuit board 35 and soldering the first and second terminals 33 and 34 on the conduction pattern (not shown), the battery 32 is inserted in a slanted state into the case 31 through its opening 31c. During this action, the battery 32 is engaged by the protruding barriers 31e and 31f provided toward the upper end of the peripheral wall 31b, and its bottom face (the negative pole face) 32b is held by being in contact with the second contact 34a arranged on the bottom plate 31a, and the peripheral face (the positive pole face) 32a of the battery 32 is housed in the case 31 by being in contact with the paired first terminals 33a.

However, in the conventional battery holder structure for the flat battery described above, the protruding barriers 31e and 31f for preventing the battery 32 from coming off are formed toward the upper end of the peripheral wall 31b of the case 31, and the battery is inserted in the slanted state into the opening 31c of the case 31 to have the battery engaged by these protruding barriers 31e and 31f. Therefore, considering the ease of inserting the battery, it is impossible to form the protruding barriers 31e and 31f in too large a size, and this makes it impossible to engage the battery 32 so firmly, resulting in the problem that any vibration or impact from outside may cause the battery 32 to spring out of the case 31 or its contacts to become momentarily disconnected to let the power supply go off.

SUMMARY OF THE INVENTION

An object of the present invention, therefore, is to solve the above-noted problem and to provide a battery holder for a flat battery which, when a flat battery is to be inserted into the battery holder, allows the battery to be easily inserted and held firmly to prevent it from springing out or its contacts from becoming disconnected when any vibration or impact from outside is suffered.

In order to achieve the object stated above, according to a first aspect of the invention, there is provided a battery holding section comprising a bottom plate meeting one face of a flat battery, a peripheral wall meeting the peripheral face of the battery, a case having in its top face an opening through which the battery is to be inserted, and first and second terminals, arranged within this opening of the case, to be in elastic contact with the poles of the battery, wherein protruding barriers are formed toward one end of the opening in the case to engage with the top face of the inserted battery to prevent the battery from coming off, and elastically deformable elastic arms toward the other end of the opening in the case opposite these protruding barriers, the arms turning toward the bottom plate along with the insertion of the battery and pressing the peripheral face of the battery toward the peripheral wall.

According to a second aspect of the invention, there are formed, toward one end of the peripheral wall where the battery holding section is formed, the first terminal pressing the battery toward the opposite part of the peripheral wall by being in contact with the peripheral face of the battery and, toward the other opposite end of the peripheral wall, the second terminal pressing the battery toward the protruding barriers provided toward the top face of the opening of the case by being in contact with one face of the battery, wherein the peripheral face of the inserted battery is pressed by the pressures of both the elastic arms and the first terminal toward the opposite part of the peripheral wall where the protruding barriers are formed.

According to a third aspect of the invention, the elastic arms are formed of hinges integrally extending from the peripheral wall of the case, and the battery holding section is rotatably held by the peripheral wall of the case via the elastic arms.

According to a fourth aspect of the invention, the battery holding section has a receptacle at the center of which the battery is to be inserted and pinches, opposite each other with this receptacle in-between, for pinching the battery, wherein a slope for preventing the battery from being inserted any farther, when it is inserted in the wrong direction, by being in contact with an edge of the top face of the battery is provided in the lower part within the pinches formed toward the bottom face.

According to a fifth aspect of the invention, the diameter of the hollow part of a virtual circle which is the trajectory of a tip of the slope toward the bottom face and tips of the protruding barriers is smaller than the external diameter of the battery.

DETAILED DESCRIPTION OF THE PREFERRED EMBODIMENTS

Figure 1:
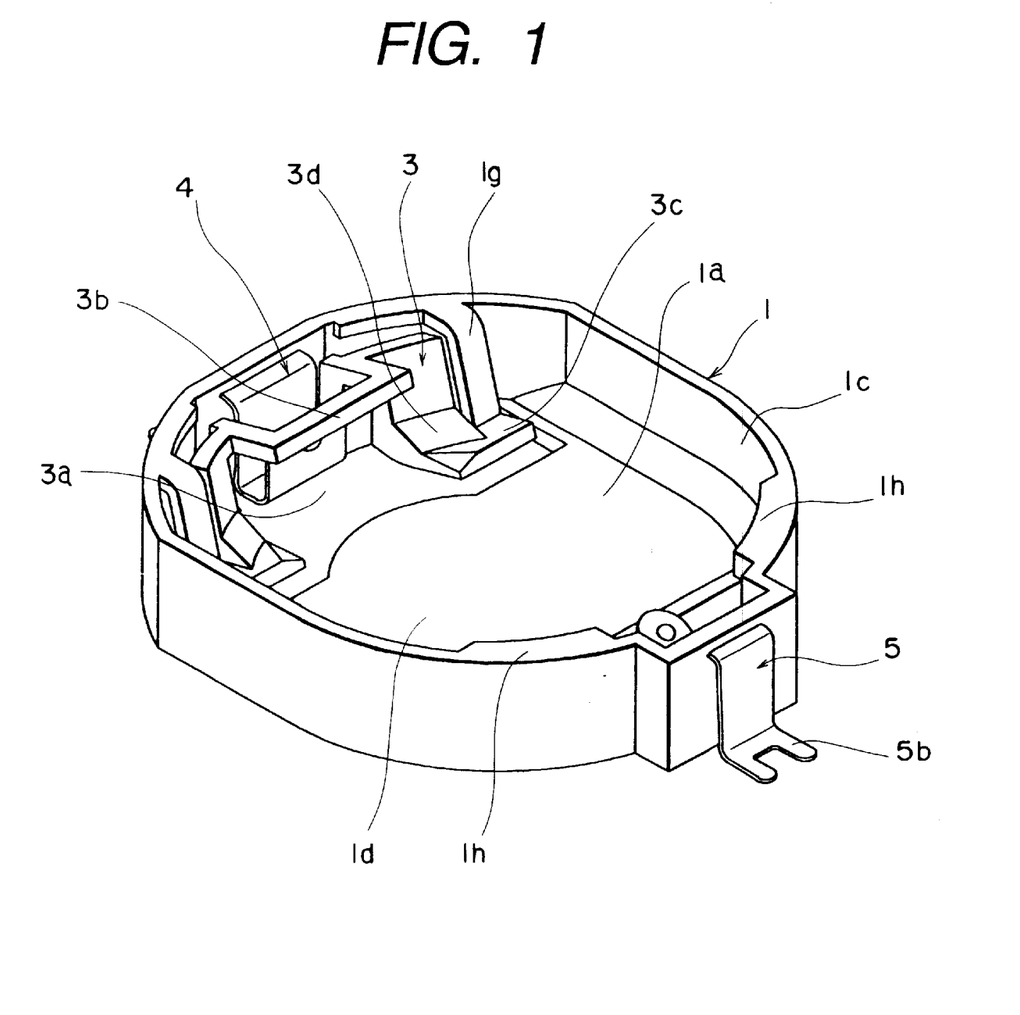
FIG. 1 shows a perspective view of a battery holder, which is a first preferred embodiment of the present invention.
Figure 2:
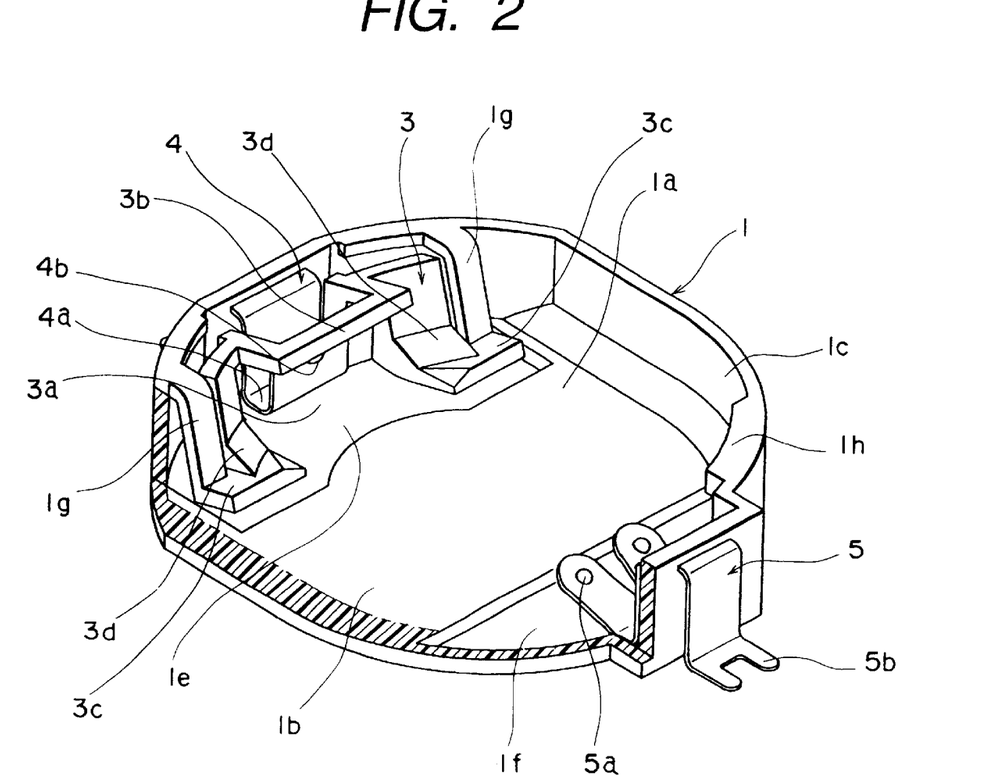
FIG. 2 shows a partially broken perspective view of the battery holder of FIG. 1 according to the invention.
Figure 3:
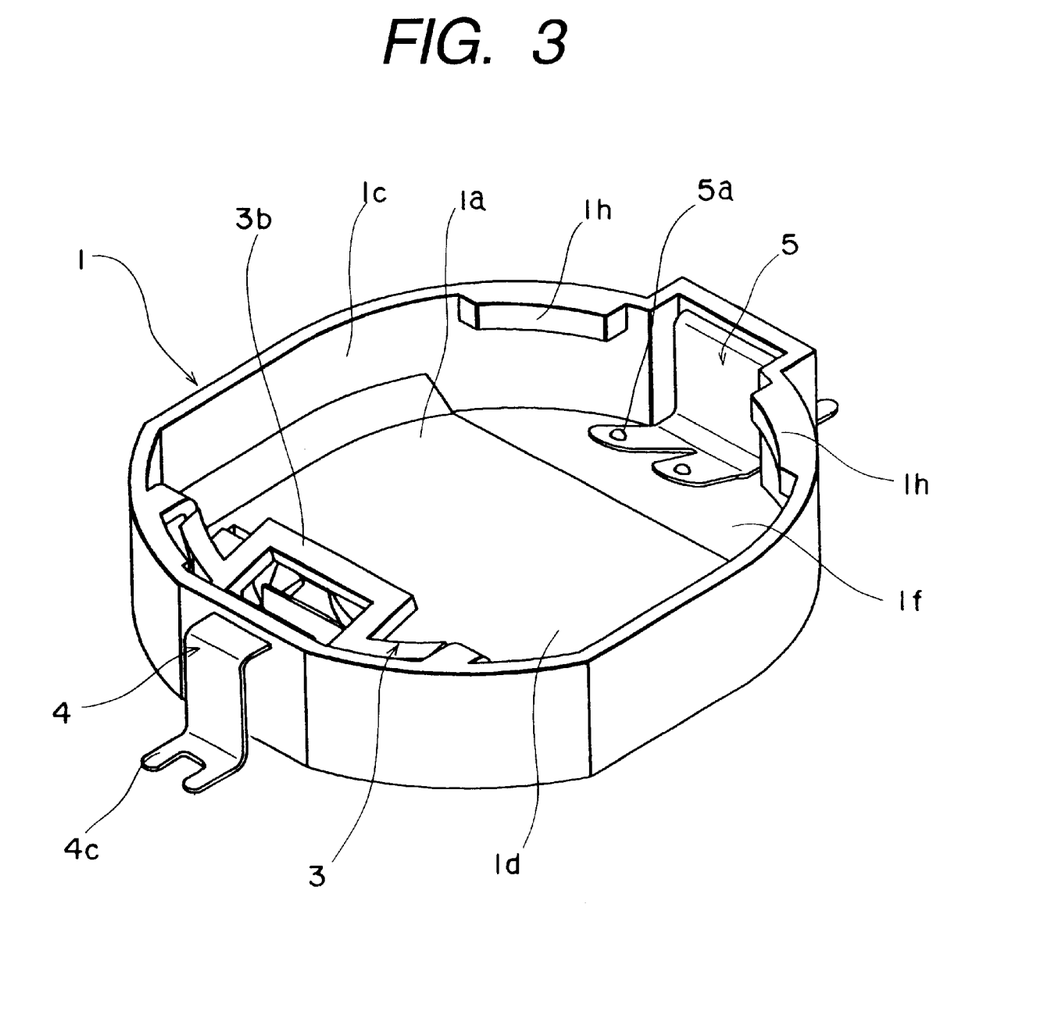
FIG. 3 shows a perspective view of the battery holder according to the invention in a direction different from FIG. 1.
Figure 4:
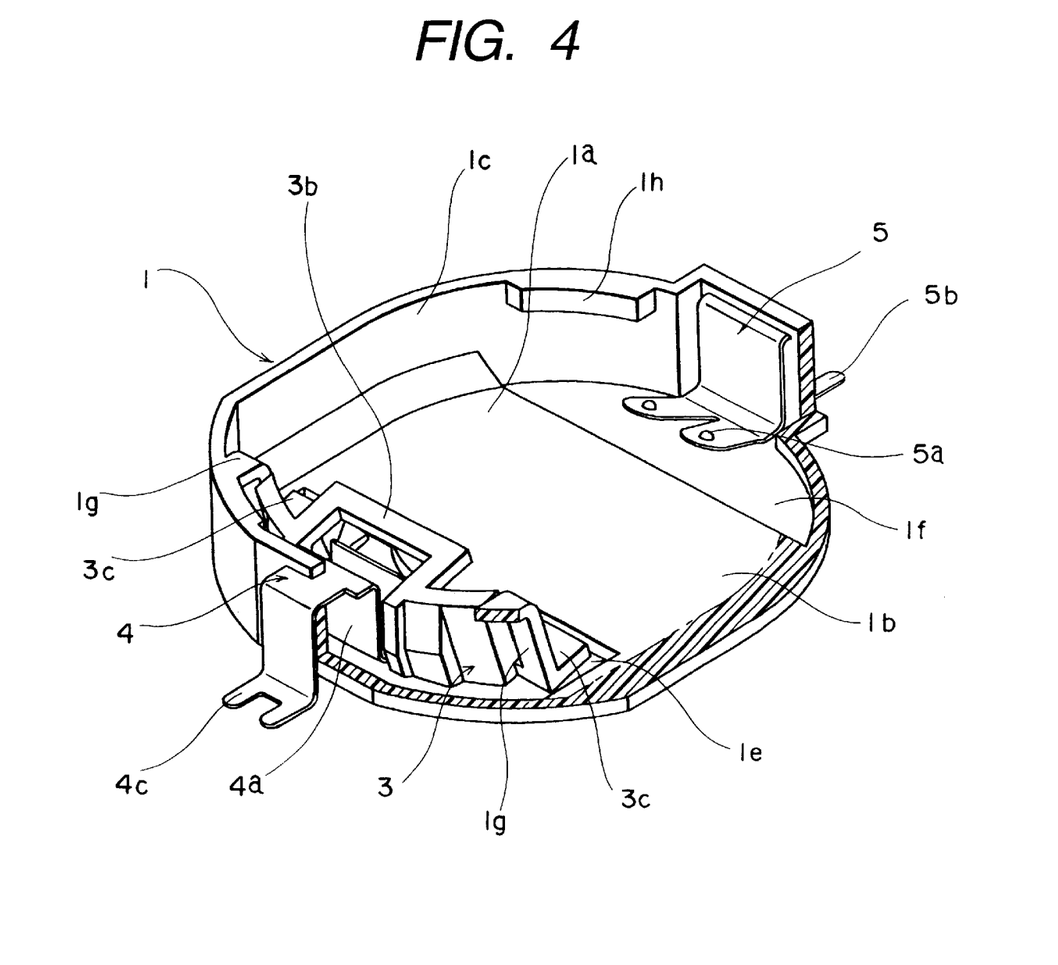
FIG. 4 shows a partially broken perspective view of the battery holder of FIG. 3 according to the invention.
Figure 5:
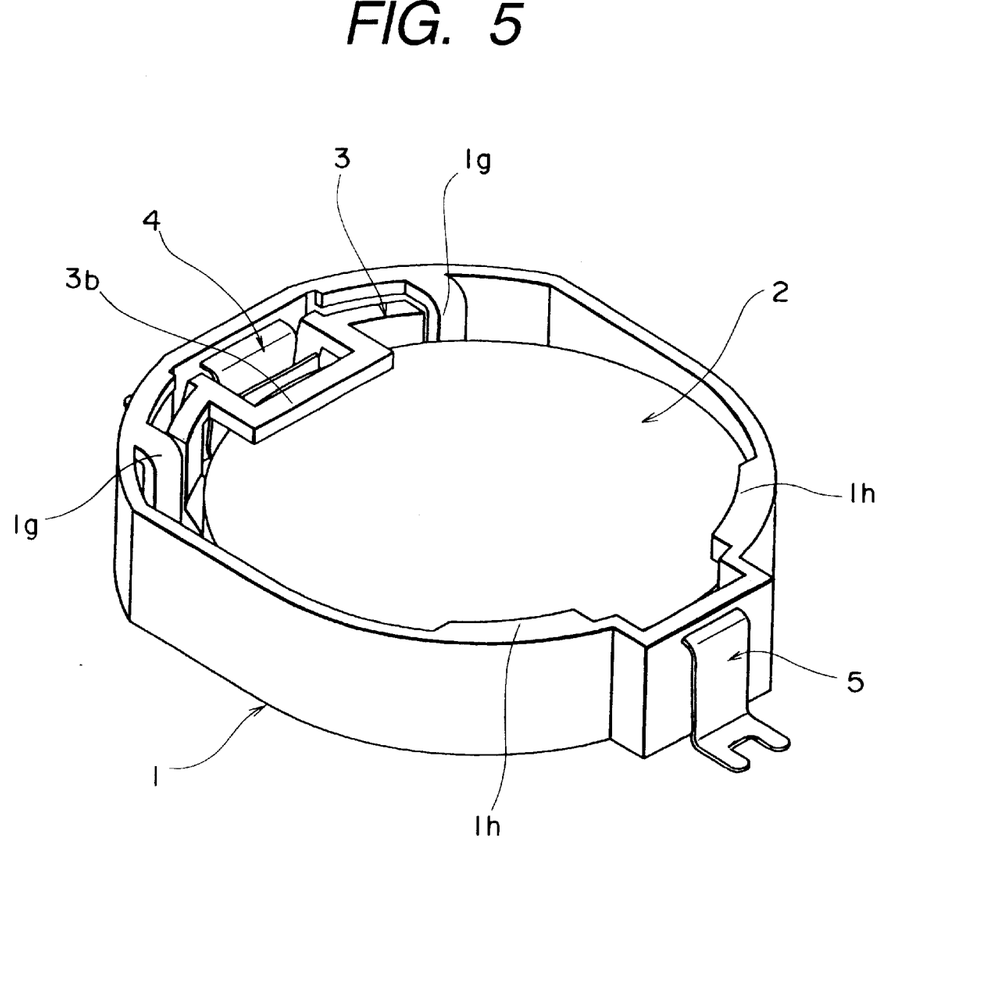
FIG. 5 shows a perspective view of the battery holder according to the invention in a state in which a battery is inserted therein.
Figure 6:
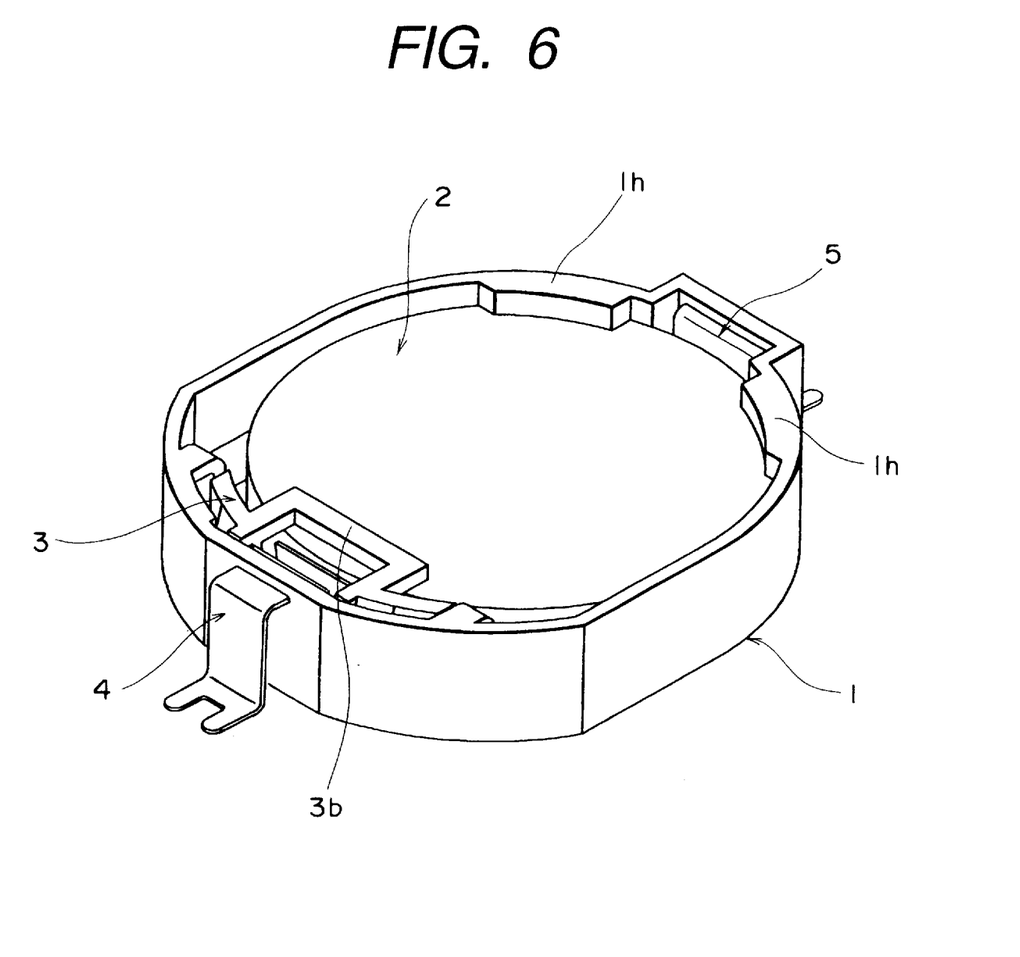
FIG. 6 shows a perspective view, in a direction different from FIG. 5, of the battery holder in a state in which a battery is inserted therein.
Figure 7:
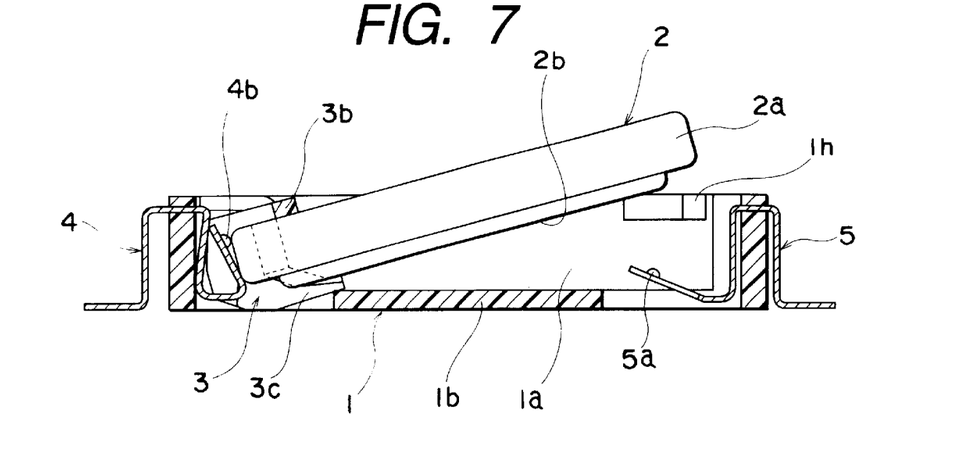
FIG. 7 illustrates a state in which the battery is being inserted into the battery holder according to the invention.
Figure 8:
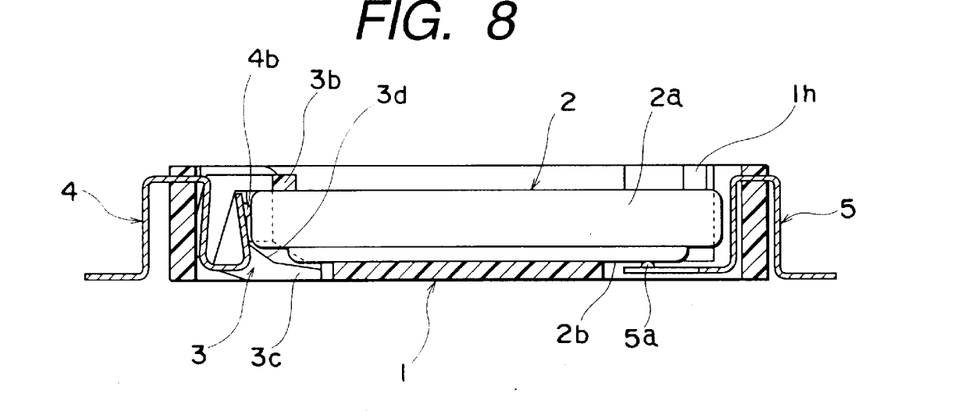
FIG. 8 illustrates a state in which the insertion of the battery into the battery holder according to the invention has been completed.
Figure 9:
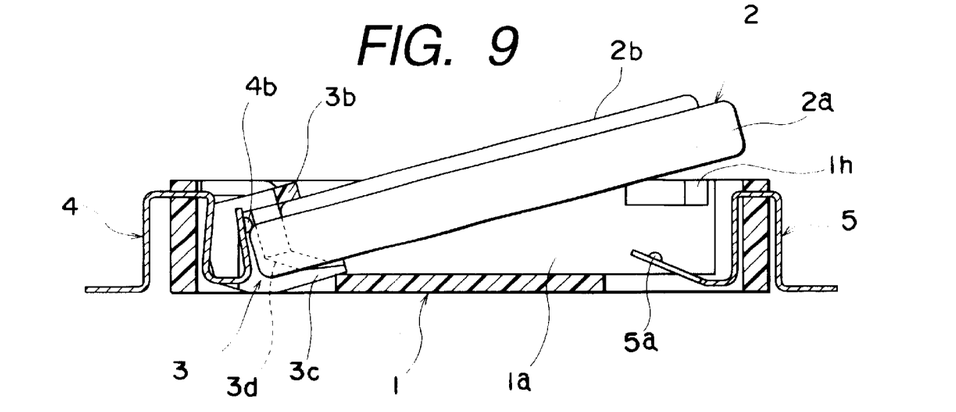
FIG. 9 illustrates a state in which the battery is inserted into the battery holder according to the invention in the wrong direction.
Figure 10:
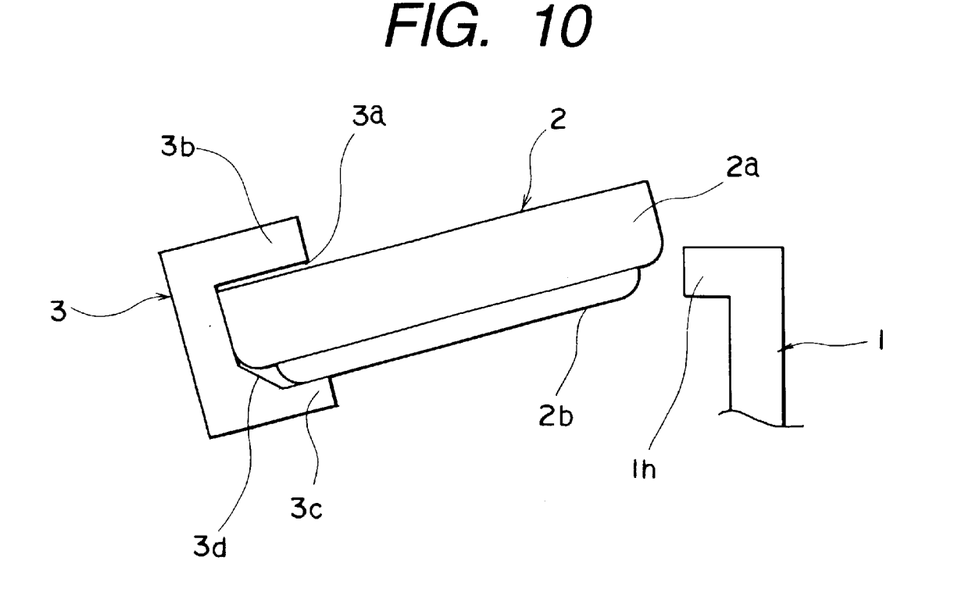
FIG. 10 schematically illustrates a state in which the battery is inserted into the battery holder according to the invention in the right direction.
Figure 11:
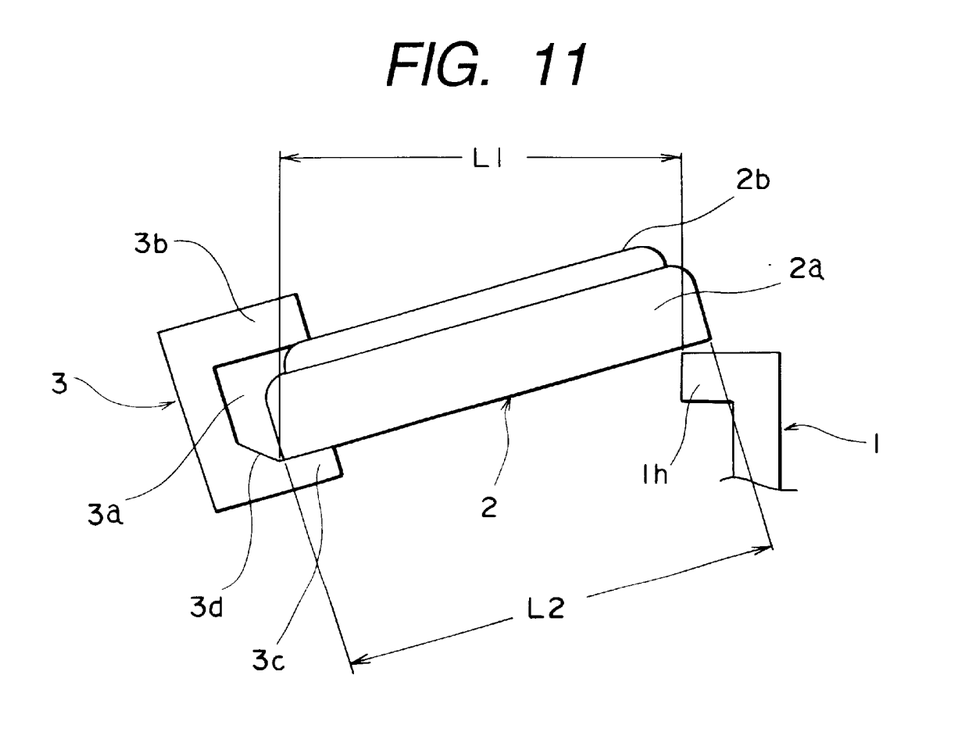
FIG. 11 schematically illustrates a state in which the battery is inserted into the battery holder according to the invention in the wrong direction.

One preferred embodiment of the present invention will be described below with reference to FIG. 1 through FIG. 11. FIG. 1 shows a perspective view of a battery holder according to the invention; FIG. 2, a partially broken perspective view of the battery holder of FIG. 1; FIG. 3, a perspective view of the battery holder in a direction different from FIG. 1; FIG. 4, a partially broken perspective view of the battery holder of FIG. 3; FIG. 5, a perspective view of the battery holder in a state in which a battery is inserted therein; FIG. 6, a perspective view, in a direction different from FIG. 5, of the same state; FIG. 7 illustrates a state in which the battery is being inserted into the battery holder; FIG. 8, a state in which the insertion of the battery into the battery holder has been completed; FIG. 9, a state in which the battery is inserted into the battery holder in the wrong direction; FIG. 10 schematically illustrates a state in which the battery is inserted into the battery holder in the right direction; FIG. 11, a state in which the battery is inserted into the battery holder in the wrong direction.

In the drawings, a case 1, consisting of an insulator such as a synthetic resin, is formed in a substantially cylindrical shape with a housing 1a for housing a flat battery 2 being formed at the center. In this housing 1a are formed a flat bottom plate 1b meeting one face of the battery 2 and a peripheral wall 1c meeting the peripheral face of the battery 2 starting on the peripheral edge of this bottom plate 1b, wherein the top face of this peripheral wall 1c constitutes an opening 1d through which the battery 2 is to be inserted.

At the lower end of the housing 1a are provided a pair of ports 1e and 1f; at one end of the peripheral wall 1c meeting one port 1e there is arranged a first terminal 4, to be described in further detail afterwards, to come into contact with the peripheral face 2a, which is the positive pole face of the battery 2, and at the other end of the peripheral wall 1c meeting the other port 1f, a second terminal 5, to be described in further detail afterwards, to come into contact with one face (the bottom face) 2b of the battery 2, which is the negative pole face.

Toward one end of the peripheral wall 1c where the first terminal 4 is arranged, a battery holding section 3 is integrally formed via elastic arms 1g consisting of elastically deformable hinges. This battery holding section 3 is fitted to the peripheral wall 1c rotatably by the elasticity of the elastic arms 1g, and a receptacle 3a having a space at the center into which the battery is to be inserted and pinches 3b and 3c arranged opposite to each other vertically with this receptacle 3a in-between are formed therein. Of these pinches 3b and 3c, the pinch 3c formed toward the bottom face has in the lower part of its inside a slope 3d, which prevents the battery 2, when it is inserted in the wrong direction, from being inserted any farther by being in contact with an edge of the top face of the battery 2.

Toward the other side of the peripheral wall 1c where the second terminal 5 is arranged, a pair of protruding barriers 1h are formed protruding into the opening 1d with the second terminal 5 in-between. Therefore, when the battery 2 is inserted into the housing 1a, the top face of the battery 2 comes into contact with the protruding barriers 1h and its upward movement is thereby controlled, with the result that the battery 2 is prevented from coming off the opening 1d.

The configuration is such that, in a state before the battery 2 is inserted into the housing 1a, the diameter L1 of the hollow part of a virtual circle which is the trajectory of the bottom face tip of the slope 3d, provided toward the bottom face of the battery holding section 3, and the tips of the protruding barriers 1h be smaller than the external diameter L2 of the battery 2, so that the insertion of the battery 2 in the wrong direction can be prevented without fail. The pinches 3b provided toward the top face are formed longer than the protruding barriers 1h in the protruding direction, so that it can be securely engaged with the top face of the battery 2 (FIG. 10 and FIG.

The first terminal 4, formed of a plate of springy metal, such as stainless steel, and nickel-plated or otherwise appropriately treated on the surface as required. Toward one end of this first terminal 4 is formed a substantially U-shaped bend 4a, and at the free end of this bend 4a is formed a first contact 4b consisting of a protrusion. The first contact 4b is pressed by the springiness of the bend 4a into contact with the peripheral face 2a, which is the positive pole face of the battery 2. Toward the other end of the first terminal 4 is formed a first connector 4c extending from the first contact 4b, and its tip is led toward outside the case 1.

The second terminal 5, formed of a plate of springy metal, such as stainless steel, and nickel-plated or otherwise appropriately treated on the surface as required. One end of this second terminal 5 is folded in a substantial L shape and forked, and at its tip, so formed as to be directed toward the opening 1d of the housing 1a, a second contact 5a consisting of a protrusion is formed. This second contact 5a is pressed by the springiness of the bottom face 2b into contact with one face of the battery 2, which is its negative pole face. Toward the other end of the second terminal 5 is formed a second connector 5b extending from the second contact 5a, and its tip is led toward outside the case 1.

Next, to house the battery 2 in the battery holder according to the invention, the battery holder is mounted on a printed circuit board (not shown), and the connectors 4c and 5b of the first and second terminals 4 and 5 are soldered to the conduction pattern (not shown) by reflowing or otherwise.

Next, the battery 2 is inserted through the opening 1d of the case 1. In this process, the tip of the battery 2 is inserted into the receptacle 3a of the battery holding section 3 provided toward one end of the opening 1d, and along with this insertion the battery holding section 3 is rotated toward the bottom plate 1b by the elastic deformation and resultant flexure of the elastic arms 1g connected to the peripheral wall 1c. The flexure and rotation of the battery holding section 3 causes the other end of the battery 2 to be inserted into the opening 1d without coming into contact with the protruding barriers 1h and housed in the housing 1a.

In this case, before it is inserted, the receptacle 3a of the battery holding section 3 is expanded toward the opening 1d by the springiness of the elastic arms 1g, and the battery 2 is inserted from obliquely above, with the result that, even if the pinches 3b formed toward the top face are formed somewhat longer, the elastic arms 1g are made flexible and rotated along with the insertion of the battery 2. Therefore, the insertion of the battery 2 is facilitated and secure holding of the battery is ensured.

In a state wherein the battery 2 is housed in the housing 1a, the peripheral face 2a of the battery 2, which is the positive pole face, comes into contact with the first contact 4b, and is pressed by both the pressure of the springiness of the first terminal 4 and that of the elasticity of the elastic arms 1g of the battery holding section 3 toward the opposite peripheral wall 1c where the protruding barriers 1h are formed. The bottom face 2b of the battery 2, which is the negative pole face, comes into contact with the second contact 5a, and the top face is pressed by the elasticity of the second terminal 5 toward the protruding barriers 1h. As a result it is made possible to firmly engage the battery 2 in the vertical and lateral directions, so that the battery 2 can be held in the housing 1a securely. In this state, the battery 2 is housed within the case 1 in a state in which it is connected to the first contact 4b of the first terminal 4 and the second contact 5a of the second terminal 5.

Next will be stated with reference to FIG. 9 through FIG. 11 what will happen if the battery 2 is inserted in the wrong direction. FIG. 9 illustrates a state in which the battery 2 is inserted in the wrong direction. Where the battery 2 is inserted upside down through the opening 1d of the case 1 (with the bottom face 2b of the battery 2, which is the negative pole face, directed upward), the tip of the battery 2 is inserted into the receptacle 3a of the battery holding section 3 provided toward one end of the opening 1d. Within the pinch 3c provided toward the bottom face, out of the pinches 3b and 3c provided vertically opposite each other with this receptacle 3a in-between, there is provided the slope 3d. When the battery 2 is inserted in the right direction as shown in FIG. 10, the slope 3d and the lower peripheral edge of the battery 2 do not come into contact with each other, but if the battery 2 is inserted in the wrong direction as shown in FIG. 11, the lower peripheral edge of the battery 2 will come into contact with this slope 3d.

As a result, if the battery 2 is inserted in the wrong direction, the battery 2 can be prevented from being inserted any farther into the receptacle 3a and the peripheral edge of the battery 2 hits the tips of the protruding barriers 1h provided in the opening 1d so that the insertion of the battery 2 can be prevented.

Furthermore, in a state in which the battery 2 is not inserted into the housing 1a, the diameter L1 of the hollow part of a virtual circle which is the trajectory of the bottom face tip of the slope 3d, provided in the lower part of the inside of the pinches 3c formed toward the bottom face of the battery holding section 3, and the tips of the protruding barriers 1h is smaller than the external diameter L2 of the battery 2, so that the insertion of the battery 2 in the wrong direction can be prevented without fail.

In the above-described battery holder configuration according to the present invention, there is formed the battery holding section 3 having the elastic arms 1g at one end of the case 1 having at the top the opening 1d through which the battery 2 is to be inserted, and the receptacle 3a of this battery holding section 3 is expanded toward the opening 1d by the springiness of the elastic arms 1g, so that the elastic arms 1g be made flexible and rotated along with the insertion of the battery 2, thereby facilitating the insertion of the battery 2.

Toward the other end of the opening 1d opposite the battery holding section 3, there are formed the protruding barriers 1h which engage with the top face of the inserted battery 2 and prevent the battery 2 from coming off, and the peripheral face 2a of the battery 2 inserted into the case 1 is pressed toward the peripheral wall 1c, where the protruding barriers 1h opposite the peripheral face 2a of the battery 2 are formed, by the springy pressure of the elastic arms 1g in addition to the pressure of the first terminal 4, making it possible to firmly engage the battery 2 in the vertical and lateral directions and to prevent the battery 2 from springing out of the case 1 or its contacts from becoming disconnected momentarily to cut off power supply when any vibration or impact from outside is suffered.

The elastic arms 1g are formed of hinges integrally extending from the peripheral wall 1c of the case 1, and these hinges hold the battery holding section 3 rotatably onto the peripheral wall 1c of the case 1, making it possible to simplify the structure and to reduce the cost.

Figure 12:
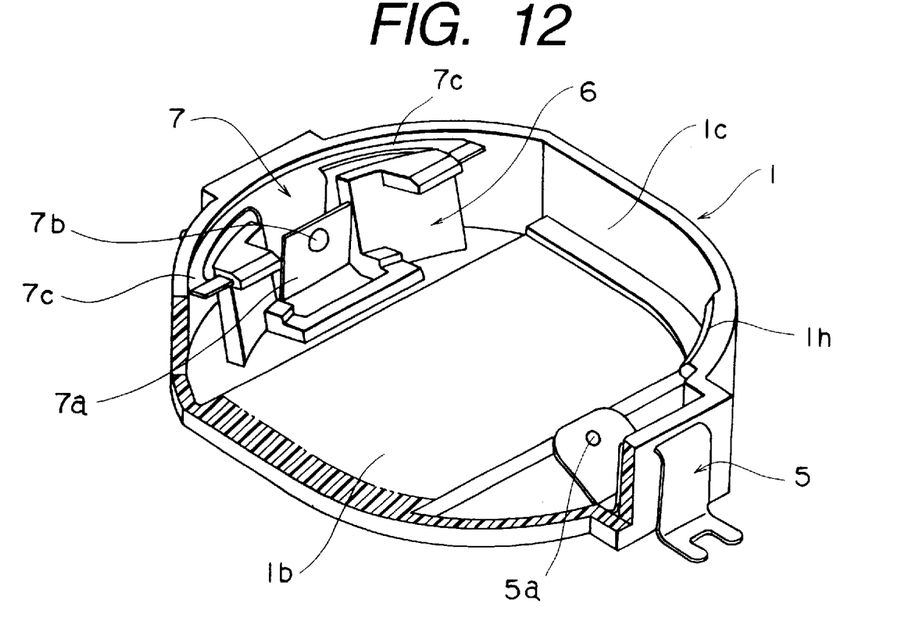
FIG. 12 shows a partially broken perspective view of the battery holder, which is another preferred embodiment of the invention.
Figure 13:
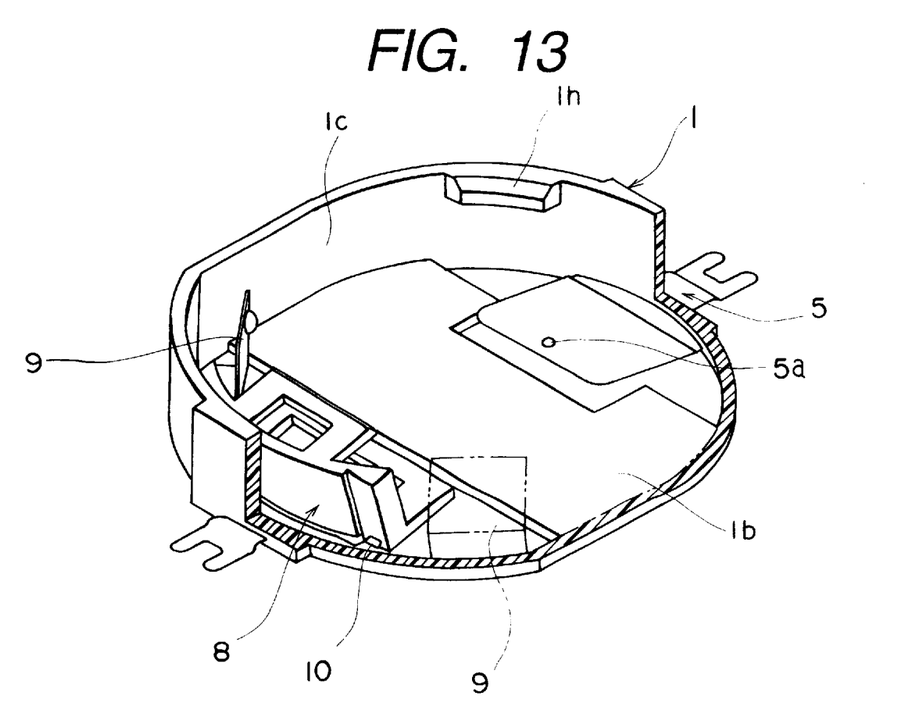
FIG. 13 shows a partially broken perspective view of the battery holder, which is still another preferred embodiment of the invention.

FIG. 12 and FIG. 13 illustrate other embodiments of the present invention, each showing a partially broken perspective view of a battery holder according to the invention.

The same constituent elements already described with reference to any of FIG. 1 through FIG. 11 are assigned respectively the same reference signs, and their description is dispensed with.

The battery holders illustrated in FIG. 12 and FIG. 13 partly differ in structure of the battery holding section 3 from the first embodiment earlier described. While the battery holding section 3 in the first embodiment is formed integrally with the peripheral wall 1c of the case 1 through the elastic arms 1g consisting of hinges of the same material as the case 1, the elastic arms in either of these other embodiments is formed of a separate constituent element, consisting of a metallic plate or the like different from the case 1.

A battery holding section 6 shown in FIG. 12 is rotatably fitted to a metal-built first terminal 7, and toward top ends of both sides of a bend 7a, where a first contact 7b of the first terminal 7 is formed, elastic arms 7c consisting of extended hinges are formed. In this structure, the battery holding section 6 is held rotatably by the springiness of the metallic material and the pressure applied on the peripheral face 2a of the battery 2 at the time of its insertion utilizes the springiness of the metallic material, resulting in a stable pressing force and therefore making it possible to hold the battery securely in the case 1. Furthermore, as the elastic arms 7c are formed on the first terminal 7, there is no need to use any additional component and to reduce the cost correspondingly.

In the battery holding section 8 shown in FIG. 13, elastic arms 10 are formed of different metal pieces from the material of a first terminal 9, and subsequently integrated as hinges. The use of separate components for the elastic arms 10 serves to simplify the structure.

As hitherto described, in a battery holder according to the present invention, there are formed, at one end of a case having at the top an opening through which a battery is to be inserted, protruding barriers which engage with the inserted battery and prevent it from coming off and, at the other end of the opening of the case opposite the protruding barriers, a battery holding section having elastically deformable elastic arms which rotate toward the bottom plate and press the peripheral face of the battery toward the peripheral wall along with the insertion of the battery, so that the elastic arms are made flexible and rotated along with the insertion of the battery, thereby facilitating the insertion of the battery and making it possible to hold the battery securely.

Toward one end of the peripheral wall where the battery holding section is formed, a first terminal to press the battery toward the opposite part of the peripheral wall by being in contact with the peripheral face of the battery is formed and, toward the other opposite end of the peripheral wall, a second terminal to press the battery toward the protruding barriers provided toward the top face of the opening of the case by being in contact with one face of the battery is provided, wherein the peripheral face of the inserted battery is pressed by the pressures of both the elastic arms and the first terminal toward the opposite part of the peripheral wall where the protruding barriers are formed, making it possible to firmly engage the battery in the vertical and lateral directions and to prevent the battery from springing out of the case or its contacts from becoming disconnected momentarily to cut off power supply when any vibration or impact from outside is suffered.

The elastic arms are formed of hinges integrally extending from the peripheral wall of the case, and these hinges hold the battery holding section rotatably onto the peripheral wall of the case through the elastic arms, making it possible to simplify the structure and to reduce the cost.

The battery holding section has a receptacle at the center of which the battery is to be inserted and pinches, opposite each other with this receptacle in-between, for pinching the battery, where a slope for preventing the battery from being inserted any farther, when it is inserted in the wrong direction, by being in contact with an edge of the top face of the battery is provided in the lower part within the pinches formed toward the bottom face, so that the battery, when it is inserted in the wrong direction, can be prevented from being inserted any father into the receptacle.

The diameter of the hollow part of a virtual circle which is the trajectory of a tip of the slope toward the bottom face and tips of the protruding barriers is smaller than the external diameter of the battery, so that the battery, when it is inserted in the wrong direction, can be prevented without fail from being inserted.

What is claimed is:

1. A battery holder comprising a bottom plate suitable for meeting one face of a flat battery, a peripheral wall suitable for meeting a peripheral face of the battery, a case having in its top face an opening through which the battery is to be inserted, and first and second terminals, arranged within said opening of the case, to be in elastic contact with the poles of the battery, wherein protruding barriers are formed toward one end of the opening in the case to engage with the top face of the inserted battery to prevent the battery from coming off, and a battery holding section having elastically deformable elastic arms toward the other end of the opening in the case opposite said protruding barriers, the arms suitable for turning toward the bottom plate along with the insertion of the battery and pressing the peripheral face of the battery toward the peripheral wall.

2. The battery holder according to claim 1 wherein there are formed, toward one end of the peripheral wall where the battery holding section is formed, the first terminal suitable for pressing the battery toward the opposite part of the peripheral wall by being in contact with the peripheral face of the battery and, toward the other opposite end of the peripheral wall, the second terminal suitable for pressing the battery toward the protruding barriers provided toward the top face of the opening of the case by being in contact with one face of the battery, the peripheral face of the inserted battery being pressed by the pressures of both the elastic arms and the first terminal toward the opposite part of the peripheral wall where the protruding barriers are formed.

3. The battery holder according to claim 1 wherein the elastic arms are formed of hinges integrally extending from the peripheral wall of the case, and the battery holding section is rotatably held by the peripheral wall of the case via the elastic arms.

4. The battery holder according to claim 1 wherein the battery holding section has at the center a receptacle into which the battery is to be inserted and pinches, opposite each other with this receptacle in-between, for pinching the battery, in which a slope for preventing the battery from being inserted any farther, when it is inserted in the wrong direction, by being in contact with an edge of the top face of the battery, is provided in the lower part within the pinches formed toward the bottom face.

5. The battery holder according to claim 1 wherein the diameter of the hollow part of a virtual circle which is the trajectory of a tip of the slope toward the bottom face and tips of the protruding barriers is smaller than the external diameter of the battery.

* * * * *